United States Patent [19]

Lee et al.

[11] Patent Number: 5,708,661
[45] Date of Patent: Jan. 13, 1998

[54] ASYNCHRONOUS TRANSFER MODE CELL DEMULTIPLEXING CONTROL APPARATUS

[75] Inventors: Ho Geun Lee; Mi Hae Lee; Kwang Seok Song, all of Daejeon, Rep. of Korea

[73] Assignees: Electronics and Telecommunications Research Institute, Daejeon; Korea Telecommunication Authority, Seoul, both of Rep. of Korea

[21] Appl. No.: 647,736

[22] Filed: May 15, 1996

[30] Foreign Application Priority Data

Oct. 27, 1995 [KR] Rep. of Korea ............... 1995-37733

[51] Int. Cl.$^6$ ............................................. H04L 12/56
[52] U.S. Cl. ........................................ 370/399; 370/426
[58] Field of Search .................................... 370/389, 392, 370/395, 396, 397, 398, 399, 419, 409, 420, 417, 522, 422, 426, 536

[56] References Cited

U.S. PATENT DOCUMENTS

| | | | |
|---|---|---|---|
| 5,084,867 | 1/1992 | Tachibana et al. | 370/399 |
| 5,459,743 | 10/1995 | Fukuda et al. | 370/399 |
| 5,463,621 | 10/1995 | Suzuki | 370/399 |
| 5,467,349 | 11/1995 | Huey et al. | 370/397 |

OTHER PUBLICATIONS

ATM Cell Multiplexer WAC-185-A Data Sheet, Integrated Telecom Technology, Inc., Copyright 1995, pp. 1-45.

*Primary Examiner*—Chau Nguyen
*Attorney, Agent, or Firm*—Spencer & Frank

[57] ABSTRACT

An ATM cell demultiplexing control apparatus comprising an ATM switch interface circuit for performing an interface function with an ATM switch link and outputting ATM cell data received from the ATM switch link and a start signal, a register circuit being enabled in response to the start signal from the ATM switch interface circuit, the register circuit shifting the ATM cell data received from the ATM switch interface circuit to extract a virtual path indicator therefrom and outputting the extracted virtual path indicator and the received ATM cell data, a memory for storing a virtual path indicator table therein and outputting information listed in the stored virtual path indicator table as a processor routing bit map in response to the virtual path indicator from the register circuit, a local processor for updating the virtual path indicator table stored in the memory, a processor cell transmitter for outputting a reception FIFO selection signal in response to the processor routing bit map from the memory to rout the output data from the register circuit, and a plurality of reception FIFO memories being selectively enabled in response to the reception FIFO selection signal from the processor cell transmitter, the reception FIFO memories storing the output data from the register circuit therein and outputting the stored data.

5 Claims, 8 Drawing Sheets

ASYNCHRONOUS TRANSFER MODE CELL DEMULTIPLEXING CONTROL APPARATUS

BACKGROUND OF THE INVENTION

1. Field of the Invention

The present invention relates to an asynchronous transfer mode (referred to hereinafter as ATM) cell demultiplexing control apparatus for the communication among processors distributed in an ATM switching system.

2. Description of the Prior Art

Generally, message communication is performed among control system processors at low speed, whereas ATM switch links have a high data transmission rate of 155 Mbps. For this reason, as the number of processors requiring such low-speed communication is increased in future, the corresponding number of ATM switch ports will be assigned. This is not preferred in view of the availability of resources. In result, there is required means for sharing a communication network among a plurality of low-speed processors with a single ATM switch link.

SUMMARY OF THE INVENTION

Therefore, the present invention has been made in view of the above problem, and it is an object of the present invention to provide an ATM cell demultiplexing control apparatus for performing a demultiplexing operation using a virtual path indicator of an ATM cell in a single ATM switch link, thereby enabling the ATM cell to be copied to a desired number of processors. The present ATM cell demultiplexing control apparatus is further capable of performing a cell multi-copy function according to a combination.

In accordance with the present invention, the above and other objects can be accomplished by a provision of an ATM cell demultiplexing control apparatus comprising ATM switch interface means for performing an interface function with an ATM switch link and outputting ATM cell data received from the ATM switch link and a start signal, the start signal indicating that the received ATM cell is busy; register means being enabled in response to the start signal from the ATM switch interface means, the register means shifting the ATM cell data received from the ATM switch interface means to extract a virtual path indicator therefrom and outputting the extracted virtual path indicator and the received ATM cell data; storage means for storing a virtual path indicator table therein and outputting information listed in the stored virtual path indicator table as a processor routing bit map in response to the virtual path indicator from the register means; local processing means for updating the virtual path indicator table stored in the storage means; processor cell transmission means for outputting a reception FIFO selection signal in response to the processor routing bit map from the storage means to rout the output data from the register means; and a plurality of reception FIFO means being selectively enabled in response to the reception FIFO selection signal from the processor cell transmission means, the reception FIFO means storing the output data from the register means therein and outputting the stored data.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
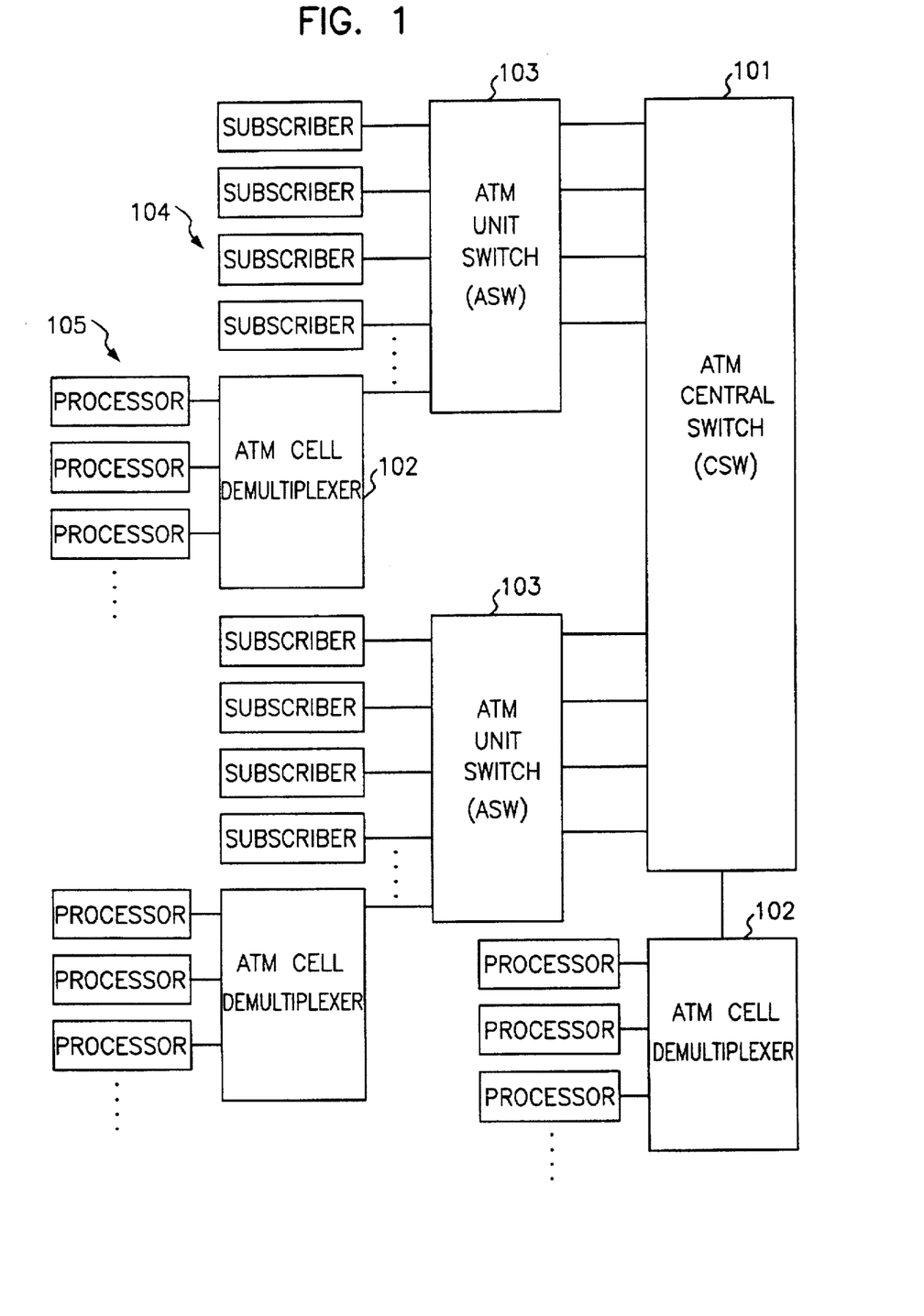
FIG. 1 is a block diagram of a general ATM switching system.

Referring to FIG. 1, there is shown a block diagram of a general ATM switching system. In this drawing, the reference numeral 101 designates an ATM central switch, the reference numeral 102 designates ATM cell demultiplexers, the reference numeral 103 designates ATM unit switches, the reference numeral 104 designates subscribers and the reference numeral 105 designates distributed processors. The distributed processors 105 control all resources in the same ATM central switch 101 according to functions. Control and status information regarding each subsystem are transmitted and received among the distributed processors 105. Such a function is called inter-processor communication. An ATM switch link is assigned to each of processors increased according to each function. This is not efficient in view of the availability of resources. Therefore, in the present invention, a group of processors belonging to each subsystem exchange messages with one another through one ATM cell demultiplexer 102.

Figure 2:
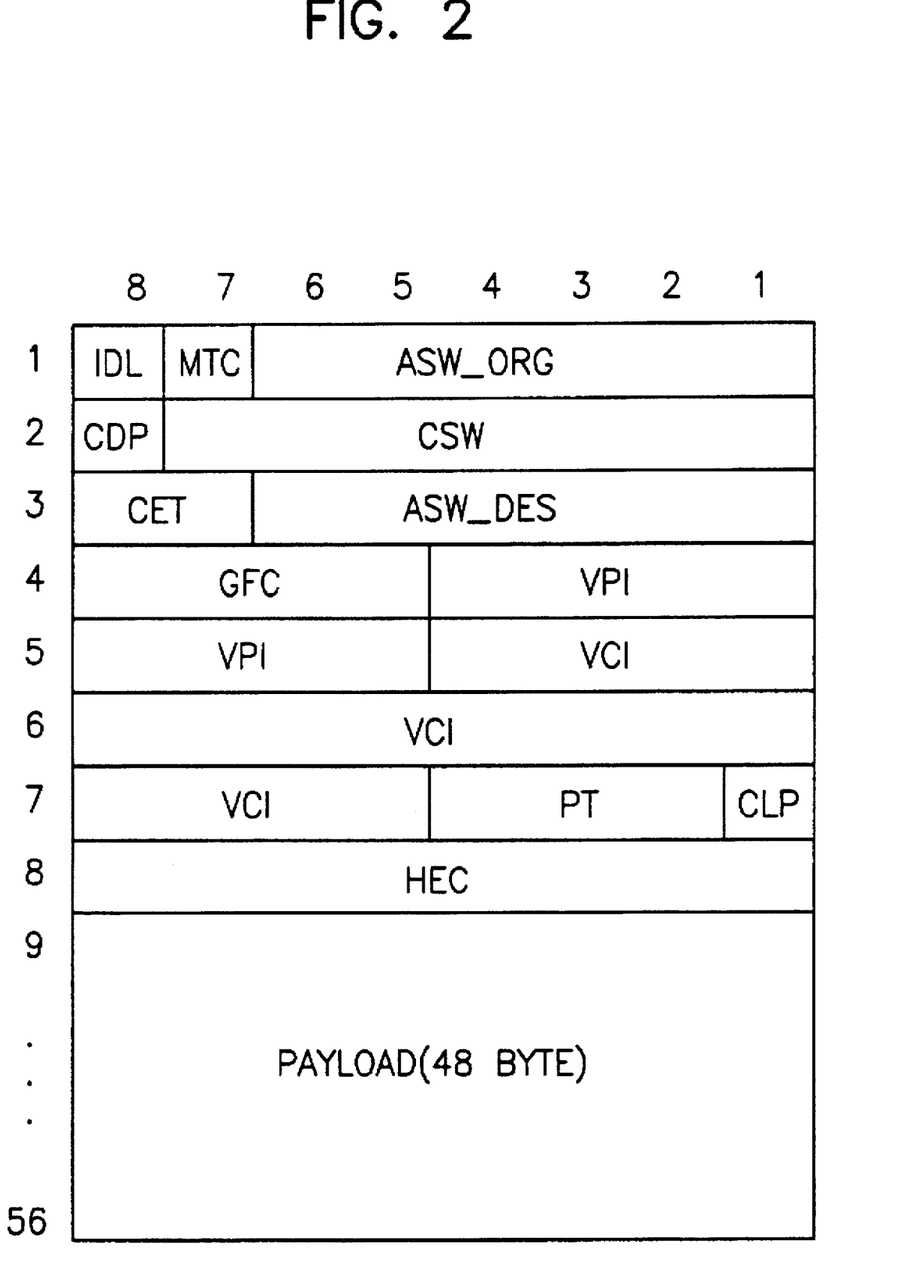
FIG. 2 is a view illustrating a format of an ATM cell in the general ATM switching system of FIG. 1.

FIG. 2 is a view illustrating a format of an ATM cell in the general ATM switching system of FIG. 1. In this drawing, high-order three bytes indicate addresses for self-routing in the ATM central switch 101. Among them, the first byte includes a most significant bit IDL 201 for indicating the validity of a cell in a synchronized ATM cell frame. The first byte also includes a bit MTC for indicating the muticasting of a transmitted cell and the remaining six bits ASW_ORG for indicating an address for the self-routing of an originating ATM unit switch ASW. The second byte includes a bit CDP for indicating a cell delay priority and the remaining seven bits CSW for indicating an address for the self-routing of an ATM central switch CSW. The third byte includes two bits CET for distinguishing a user information cell from other cells and the remaining six bits ASW_DES for indicating an address for the self-routing of a destined ATM unit switch ASW. The remaining 53 bytes constitute an ATM cell format based on the ITU standard.

Figure 3:
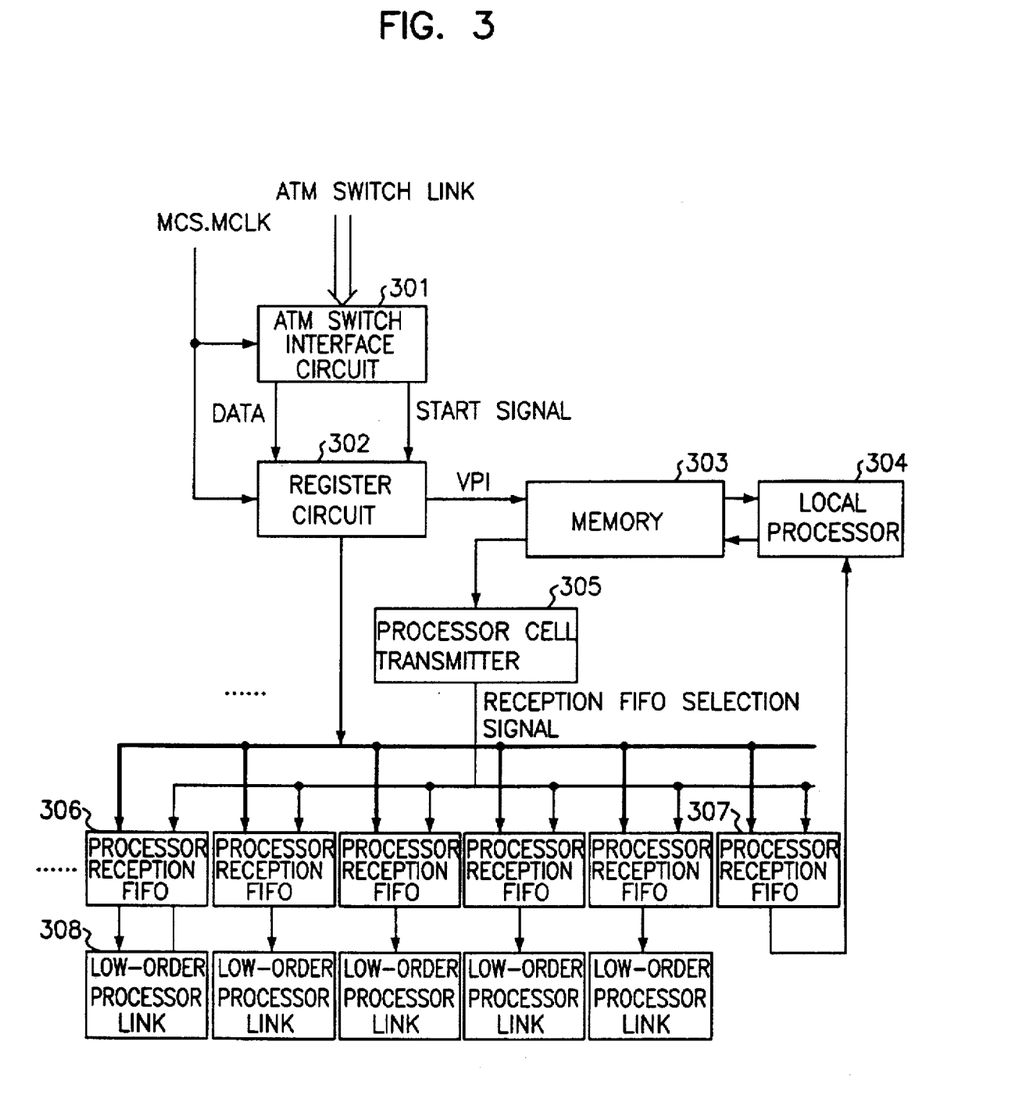
FIG. 3 is a block diagram of an ATM cell demultiplexing control apparatus in accordance with an embodiment of the present invention.

Referring to FIG. 3, there is shown a block diagram of an ATM cell demultiplexing control apparatus in accordance with an embodiment of the present invention. In this drawing, the reference numeral 301 designates an ATM switch interface circuit, the reference numeral 302 designates a register circuit, the reference numeral 303 designates a memory, the reference numeral 304 designates a local processor, the reference numeral 305 designates a processor cell transmitter, the reference numerals 306 and 307 designate processor reception first-in-first-out (referred to hereinafter as FIFO) memories and the reference numerals 308 designate low-order processor links.

The operation of the ATM cell demultiplexing control apparatus with the construction of FIG. 3 in accordance with the embodiment of the present invention will hereinafter be described in detail.

First, upon receiving ATM cell data from an ATM switch link, the ATM switch interface circuit 301 checks the most significant bit IDL of the first byte of the received ATM cell data to determine whether the ATM cell is idle or busy. If the ATM cell is busy as a result of the checking, the ATM switch interface circuit 301 outputs a start signal to the register circuit 302 to enable it. The register circuit 302 is enabled in response to the start signal from the ATM switch interface circuit 301. As being enabled, the register circuit 302 shifts the output cell data from the ATM switch interface circuit 301 to extract therefrom a virtual path indicator (referred to hereinafter as VPI) which is processor routing information. The register circuit 302 then transfers the extracted VPI to the memory 303, in which a VPI table is stored. Noticeably, the register circuit 302 is adapted to shift the output cell data from the ATM switch interface circuit 301 until the memory 303 outputs a processor routing bit map for the routing of the ATM cell in response to the transferred VPI. As mentioned above, the ATM switch interface circuit 301 does not use an FIFO memory but the register circuit 302 to extract a desired VPI from the ATM cell data. Hence, the ATM switch interface circuit 301 performs no separate read/write control operation resulting from an FIFO memory interface.

The memory 303 is preferably a dual port random access memory (DPRAM) for storing the VPI table therein. In the memory 303, the processor routing bit map is initialized in response to the initial VPI and then updated by the local processor 304, which is included in the ATM cell demultiplexer 102 (see FIG. 1). The memory 303 outputs the processor routing bit map to the processor cell transmitter 305 in response to the VPI received from the register circuit 302. The processor cell transmitter 305 outputs a reception FIFO selection signal to the plurality of processor reception FIFO memories 306 in response to the processor routing bit map from the memory 303 to preselect the associated processor link. The reception FIFO selection signal from the processor cell transmitter 305 enables the associated one of the processor reception FIFO memories 306. As being enabled, the associated processor reception FIFO memory 306 stores the output data from the register circuit 302 and then outputs the stored data to the associated low-order processor link 308. On the other hand, an external different processor may transmit a VPI table update command or other messages to the ATM cell demultiplexer 102. For provision against such a situation, the processor reception FIFO memory 307 is present in the ATM cell demultiplexer 102. The processor reception FIFO memory 307 is adapted to receive the VPI table update command or other messages from the external different processor. The processor reception FIFO memory 307 then transmits the received VPI table update command or other messages to the local processor 304. On the other hand, when the transfer of cell data is started, the register circuit 302 uses an additional bit for discrimination between cell intervals. In other words, the register circuit 302 sets the additional bit upon the initial cell transfer to clear the processor reception FIFO memories 306 when the cell transfer is erroneous.

Figure 4:
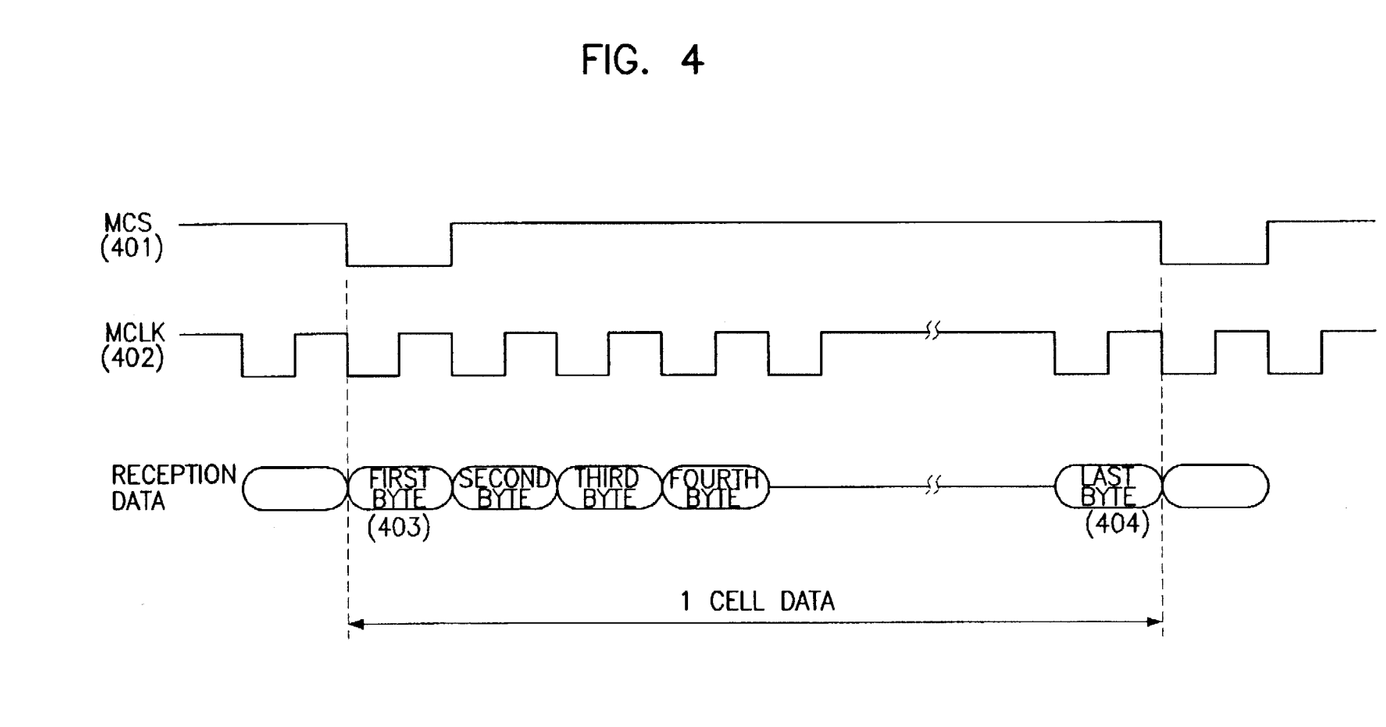
FIG. 4 is a timing diagram illustrating the operation of an ATM switch interface circuit in FIG. 3 in accordance with the embodiment of the present invention.

FIG. 4 is a timing diagram illustrating the operation of the ATM switch interface circuit 301 in FIG. 3 in accordance with the embodiment of the present invention. In this drawing, the reference numeral 401 designates an ATM cell synchronization clock MCS for indicating a transmission interval of an ATM cell and the reference numeral 402 designates a byte clock MCLK for the data transmission. The first byte of the ATM cell is loaded at a falling edge of the ATM cell synchronization clock MCS 401 and all the subsequent bytes thereof are then sequentially loaded until the subsequent falling edge of the ATM cell synchronization clock MCS 401 is initiated. The ATM switch interface circuit 301 latches the ATM cell data at the falling edge of the ATM cell synchronization clock MCS 401 and checks the most significant bit IDL of the first byte of the latched ATM cell data to determine whether the ATM cell is idle or busy.

Figure 5:
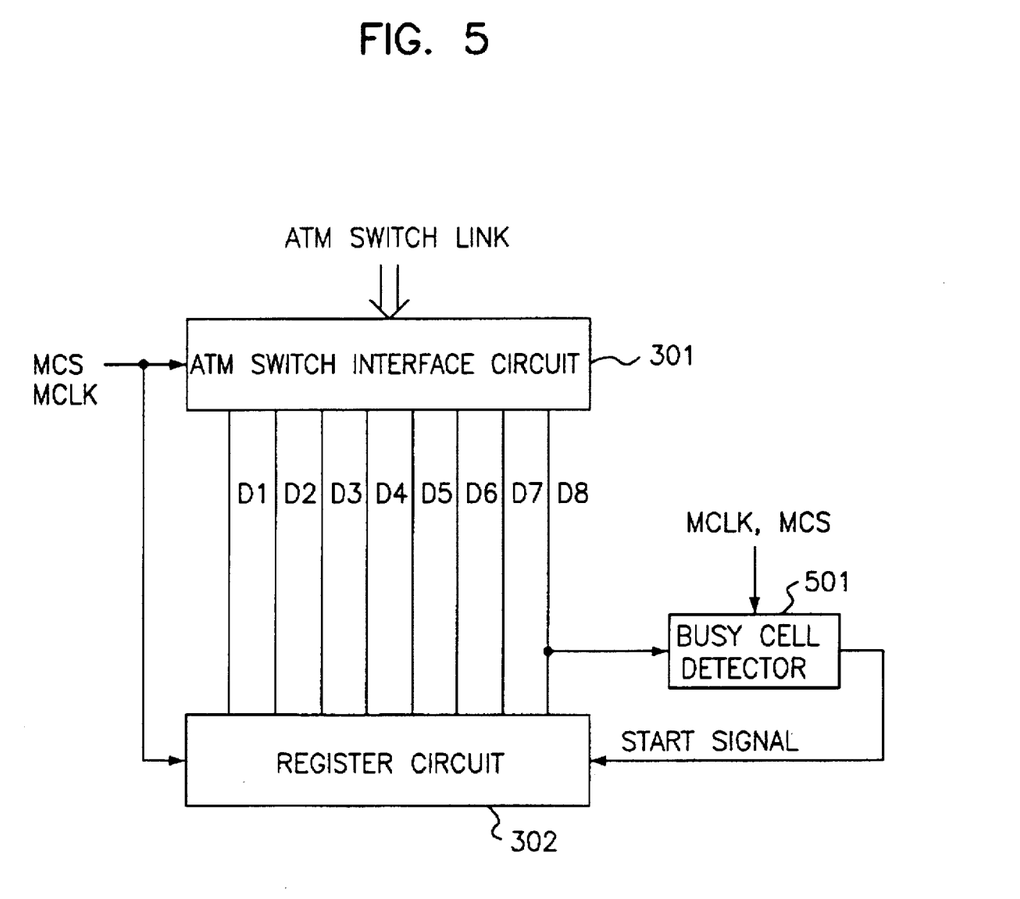
FIG. 5 is a block diagram illustrating the interface of the ATM switch interface circuit to a register circuit in FIG. 3 in accordance with the embodiment of the present invention.

FIG. 5 is a block diagram illustrating the interface of the ATM switch interface circuit 301 to the register circuit 302 in FIG. 3 in accordance with the embodiment of the present invention. As shown in this drawing, the ATM switch interface circuit 301 receives the ATM cell data from the ATM switch link and outputs the received cell data in the unit of byte. A busy cell detector 501 is provided to detect the most significant bit IDL of the first byte of the output cell data from the ATM switch interface circuit 301. The busy cell detector 501 then checks the detected most significant bit IDL to determine whether the ATM cell is idle or busy. If the ATM cell is busy, the busy cell detector 501 outputs the start signal to the register circuit 302 to enable it.

Figure 6:
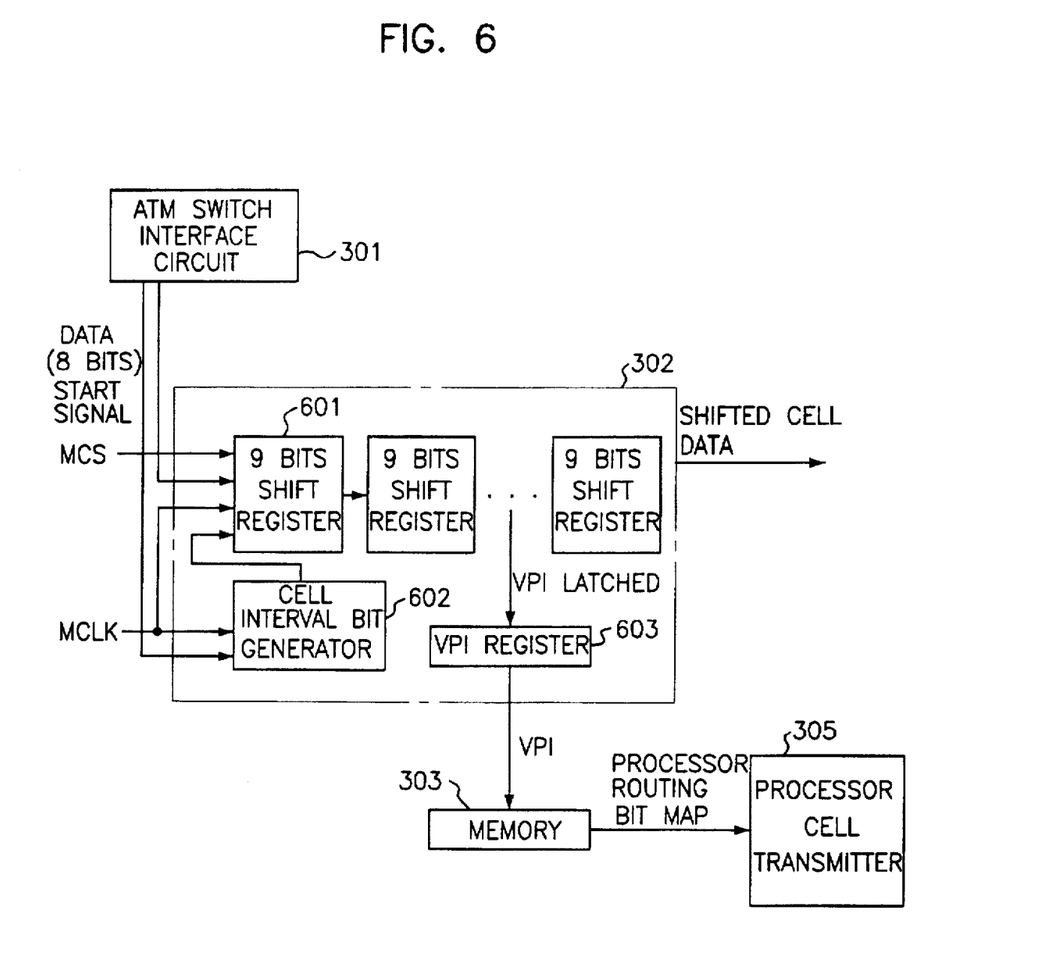
FIG. 6 is a detailed block diagram of the register circuit in FIG. 3 in accordance with the embodiment of the present invention.

FIG. 6 is a detailed block diagram of the register circuit 302 in FIG. 3 in accordance with the embodiment of the present invention. As shown in this drawing, the register circuit 302 includes a cell interval bit generator 602 being enabled in response to the start signal from the ATM switch interface circuit 301. As being enabled, the cell interval bit generator 602 generates a cell interval bit in the unit of byte in response to the byte clock MCLK. The register circuit 302 further includes a 9-bit shift register 601 being enabled in response to the start signal from the ATM switch interface circuit 301. As being enabled, the 9-bit shift register 601 shifts 8-bit cell data from the ATM switch interface circuit 301 and the cell interval bit from the cell interval bit generator 602 in response to the ATM cell synchronization clock MCS. The register circuit 302 further includes a VPI register 603 for latching the VPI from the 9-bit shift register 601 and outputting the latched VPI to the memory 303.

In operation, the 9-bit shift register 601 is enabled in response to the start signal from the ATM switch interface circuit 301. As being enabled, the 9-bit shift register 601 shifts the ATM cell data from the ATM switch interface circuit 301 in response to the ATM cell synchronization clock MCS. While shifting the ATM cell data, the 9-bit shift register 601 extracts the VPI information therefrom and transfers the extracted VPI information to the memory 303. Also, the 9-bit shift register 601 sets the cell interval bit from the cell interval bit generator 602 to "1" when the present byte is the first byte of the ATM cell, thereby allowing the low-order part to check an error of the transferred ATM cell. The VPI register 603 latches the VPI from the 9-bit shift register 601 and outputs the latched VPI to the memory 303. Noticeably, the 9-bit shift register 601 performs the shifting operation until the processor routing bit map from the memory 303 enables the processor cell transmitter 305 to determine a processor link to which the ATM cell is to be transmitted.

Figure 7:
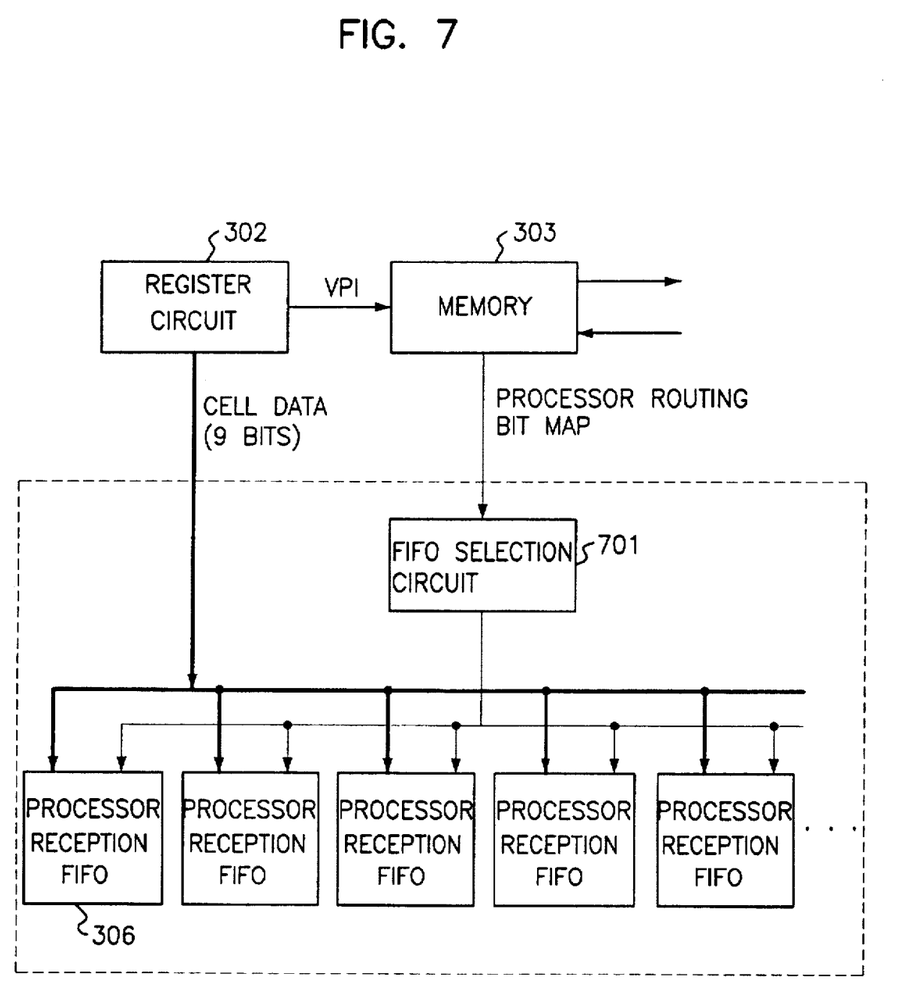
FIG. 7 is a detailed block diagram of a processor cell transmitter in FIG. 3 in accordance with the embodiment of the present invention.

FIG. 7 is a detailed block diagram of the processor cell transmitter 305 in FIG. 3 in accordance with the embodiment of the present invention. As shown in this drawing, the processor cell transmitter 305 includes an FIFO selection circuit 701 for outputting the reception FIFO selection signal to the plurality of processor reception FIFO memories 306 in response to the processor routing bit map from the memory 303 to select a desired one of them. Upon receiving the processor routing bit map from the memory 303, the FIFO selection circuit 701 enables any one of the processor reception FIFO memories 306 to be routed, so that the output cell data from the register circuit 302 can be stored in the enabled processor reception FIFO memory 306. Provided that the processor routing bit map from the memory 303 is at least one, a broadcasting function which transmits the ATM cell to a plurality of processor links can also be performed. The actual number of processor links routed by the processor cell transmitter 305 may be 256 according to the VPI, which is the number of single routings. Alternatively, the processor links may be combined into multi-routings according to the VPI. The number of data bits in the VPI table in the memory 303 must be extended by an equal amount as there are increased processor links.

Figure 8:
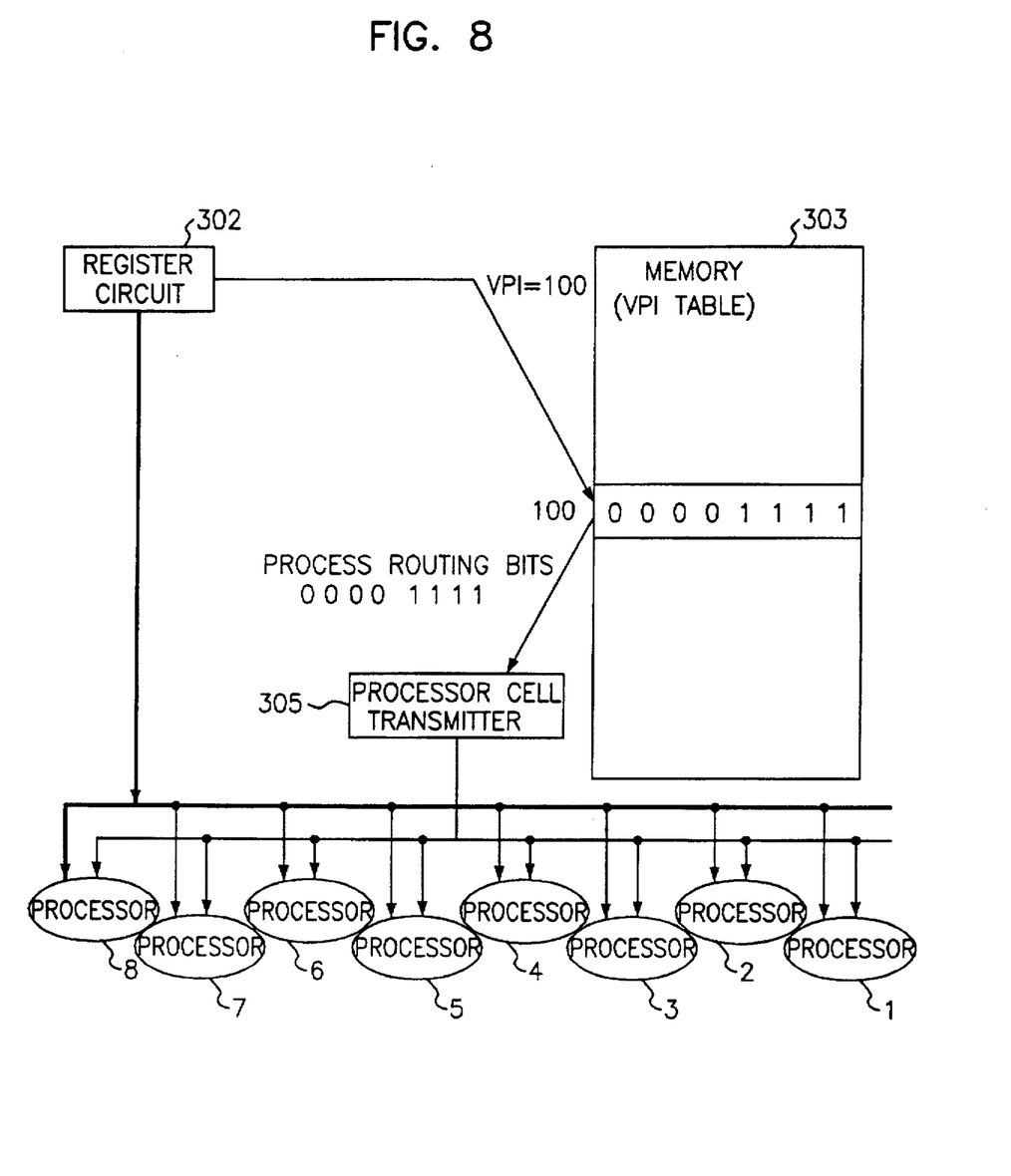
FIG. 8 is a view illustrating an ATM cell transmission process in accordance with the embodiment of the present invention.

FIG. 8 is a view illustrating an ATM cell transmission process in accordance with the embodiment of the present invention. In this drawing, for example, data in the VPI table in the memory 303 is 8 bits, an address line is 8 bits and 8 processor links are coupled to the ATM cell demultiplexer 102. For example, assuming that the VPI of the received ATM cell is "100" and a data bit value stored in the address 100 of the VPI table is "00001111", the ATM cell is not copied to the eighth, seventh, sixth and fifth processor links and it is sequentially copied to the fourth, third, second and first processor links. In other words, the processor cell transmitter 305 enables the processor reception FIFO memories 306 in response to the processor routing bit map read from the VPI table in the memory 303 to transmit the cell data to the processors.

As apparent from the above description, according to the present invention, the ATM cell received at a transmission rate of 155 Mbps can be successively transmitted to the processor links distinguished by the VPI. Further, in the case where the distributed processors communicate with one another through the ATM switch in the ATM switching system, the resources in the ATM switch can be saved and other broadcasting functions can be performed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An ATM cell demultiplexing control apparatus comprising:

ATM switch interface means for performing an interface function with an ATM switch link and outputting an ATM cell received from said ATM switch link and a start signal, the start signal indicating that the received ATM cell is busy;

register means being enabled in response to the start signal from said ATM switch interface means, said register means shifting the ATM cell data received from said ATM switch interface means to extract a virtual path indicator therefrom and outputting the extracted virtual path indicator and the received ATM cell data;

storage means for storing a virtual path indicator table therein and outputting information listed in the stored virtual path indicator table as a processor routing bit map in response to the virtual path indicator from said register means;

local processing means for updating said virtual path indicator table stored in said storage means;

processor cell transmission means for outputting a reception FIFO selection signal in response to the processor routing bit map from said storage means to route the output data from said register means; and a plurality of reception FIFO means being selectively enabled in response to the reception FIFO selection signal from said processor cell transmission means, said reception FIFO means storing the output data from said register means therein and outputting the stored data.

2. An ATM cell demultiplexing control apparatus as set forth in claim 1, further comprising busy cell detection means for latching a most significant bit of a first byte of the ATM cell data received from said ATM switch interface means to determine whether the received ATM cell is busy and outputting the start signal to said register means if the received ATM cell is busy.

3. An ATM cell demultiplexing control apparatus as set forth in claim 1, wherein said register means includes:

a cell interval bit generator being enabled in response to the start signal from said ATM switch interface means, said cell interval bit generator generating a cell interval bit in the unit of byte in response to a byte clock;

a 9-bit shift register being enabled in response to the start signal from said ATM switch interface means, said 9-bit shift register shifting 8-bit cell data from said ATM switch interface means and the cell interval bit from said cell interval bit generator in response to an ATM cell synchronization clock; and a virtual path indicator register for latching the virtual path indicator from said 9-bit shift register and outputting the latched virtual path indicator to said storage means.

4. An ATM cell demultiplexing control apparatus as set forth in claim 1, wherein said storage means includes a dual port random access memory.

5. An ATM cell demultiplexing control apparatus as set forth in claim 1, wherein said processor cell transmission means includes an FIFO selection circuit for outputting the reception FIFO selection signal to a routed one of said plurality of processor reception FIFO means in response to the processor routing bit map from said storage means to select it.

* * * * *